(12) United States Patent
Eite

(10) Patent No.: US 7,241,234 B2
(45) Date of Patent: Jul. 10, 2007

(54) SOCCER TEACHING AID

(76) Inventor: Noel Eite, 38 Ailesbury Lodge, Navan, County Meath (IE)

( * ) Notice: Subject to any disclaimer, the term of this patent is extended or adjusted under 35 U.S.C. 154(b) by 0 days.

(21) Appl. No.: 11/350,406

(22) Filed: Feb. 9, 2006

(65) Prior Publication Data

US 2006/0194652 A1    Aug. 31, 2006

Related U.S. Application Data

(63) Continuation of application No. 10/956,347, filed on Oct. 4, 2004, now abandoned, which is a continuation of application No. 09/284,452, filed as application No. PCT/IE97/00067 on Oct. 15, 1997, now abandoned.

(51) Int. Cl.
*A63B 69/00*    (2006.01)
(52) U.S. Cl. ........................ 473/446; 473/422
(58) Field of Classification Search ............. 473/422, 473/446, 569, 506, 471, 438, 424, 423, 420; 434/251, 248; D21/698, 713, 788, 799.1
See application file for complete search history.

(56) References Cited

U.S. PATENT DOCUMENTS

| 4,867,450 | A | 9/1989 | Katz |
| 5,067,719 | A | 11/1991 | Mook |
| D329,479 | S | 9/1992 | Williams ............... D21/714 |
| 5,488,780 | A | 2/1996 | Spiegel |
| D377,065 | S | 12/1996 | Soofi .................. D21/713 |
| 5,947,845 | A | 9/1999 | Canelas ................. 473/446 |
| D485,590 | S | 1/2004 | Poegel, Jr. ............. D21/714 |

FOREIGN PATENT DOCUMENTS

| EP | 233869 B | 8/1990 |
| FR | 2082655 | 12/1971 |
| FR | 2082655 A | 12/1971 |
| WO | WO86/02569 | 5/1986 |

*Primary Examiner*—Mitra Araynpour
(74) *Attorney, Agent, or Firm*—Jacobson Holman PLLC

(57) ABSTRACT

A football teaching aid includes a football having a number of differently colored target areas marked on the surface of the football, each indicating an area on the surface of the football to be struck to send the football along an associated flight path. Thus, in practice, a football coach can direct a player to strike the football in one of the colored target areas, which is easily identified by the player, to achieve a desired shot.

2 Claims, 2 Drawing Sheets

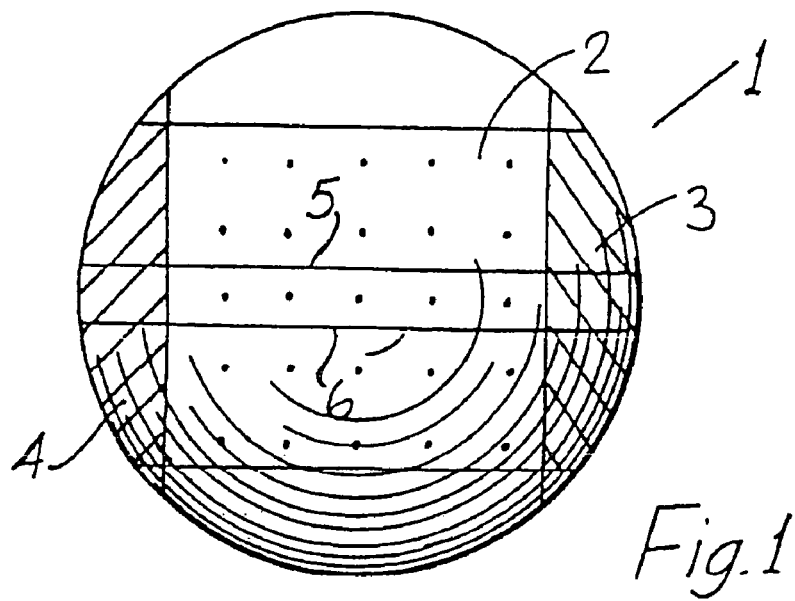
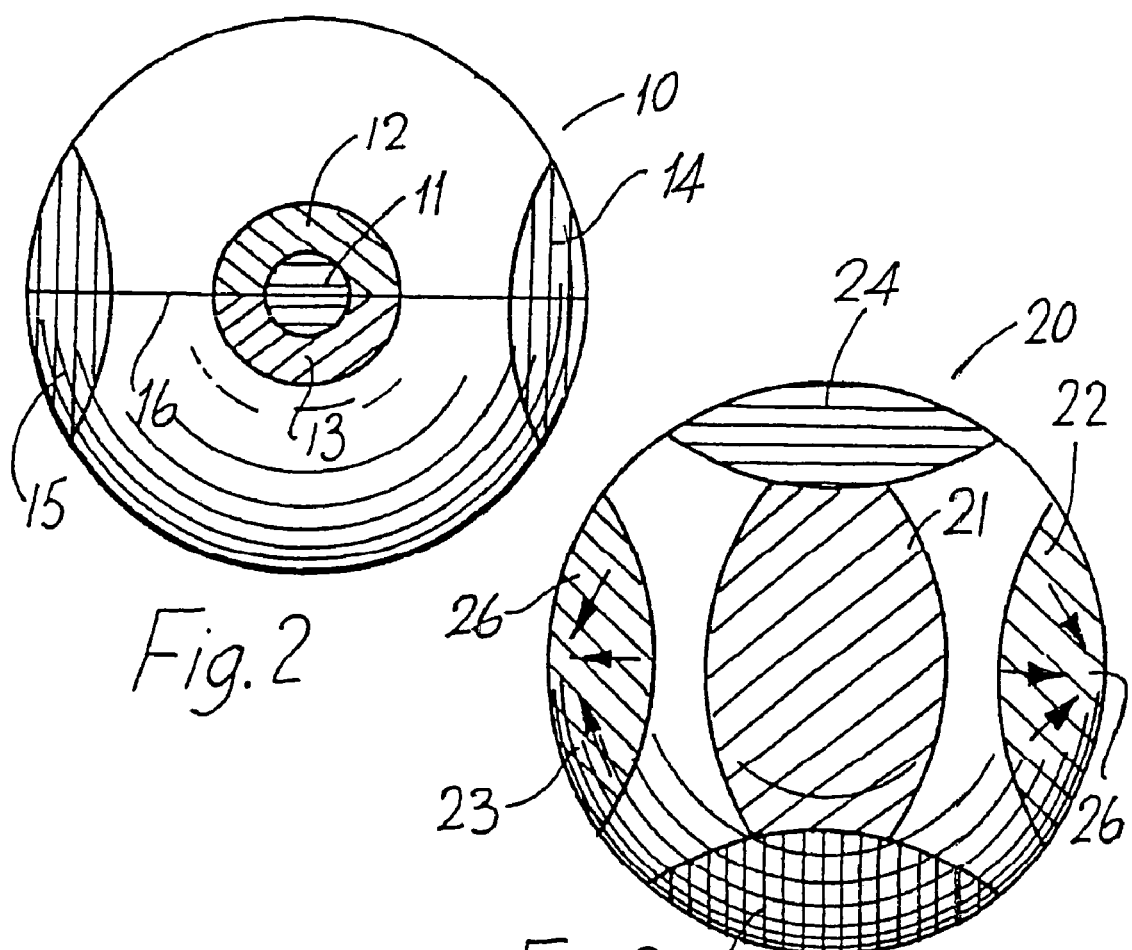

SOCCER TEACHING AID

This is a Continuation of application Ser. No. 10/956,347, filed Oct. 4, 2004 now abandoned, which in turn is a Continuation of application Ser. No. 09/284,452, filed Jun. 10, 1999 now abandoned, which in turn is a nationalization of PCT/IE97/00067 filed Oct. 15, 1997.

FIELD OF THE INVENTION

This invention relates to an educational teaching aid, and in particular to a soccer ball for the use in coaching soccer ball striking skills.

BACKGROUND OF THE INVENTION

It is well known that striking a soccer ball in different areas causes the soccer ball to travel along different flight paths. Many experienced footballers are very adept at controlling the flight of a soccer ball for passing and scoring during games by striking the soccer ball in a particular area to send the soccer ball along a desired flight path. For example, in a soccer game, when taking a free kick adjacent the penalty area, it is often desirable for an attacking player to curve the soccer ball around a defensive wall of opponent players towards the goal.

Also, different situations call for different types of shot. For example, in a defensive situation, when a defending player is clearing the soccer ball away from his goal area, the objective may be to simply kick the soccer ball as far as possible. In contrast, in an attacking situation, accuracy and good control of the soccer ball flight path, whether kicking a soccer ball directly or along a curved flight path, will be paramount and vital for scoring goals.

Similarly, for heading the soccer ball, in defensive situations a defending player will typically try to head the soccer ball in an upward direction as far away from his own goal as possible. Whereas, in an attacking situation, the attacker will often be trying to head the soccer ball in a downward direction towards the opponents goal.

Whilst anyone can kick a soccer ball, very few have the ability to accurately control the flight of the soccer ball. Soccer coaches often have difficulty in teaching players how to strike the soccer ball correctly to make the various different shots for controlling the soccer ball. This is particularly so with children and younger players generally. Many players find it difficult to follow and understand verbal instructions from the coach as to where to strike the soccer ball to achieve a desired type of shot.

The present invention is directed towards overcoming this problem.

SUMMARY OF THE INVENTION

According to the invention, there is provided a soccer teaching aid comprising a soccer ball having one or more striking targets marked on a surface of the soccer ball, each striking target indicating an area on the surface of the soccer ball where the soccer ball should be struck to send the soccer ball along an associated flight path or trajectory when struck in said target area. The soccer ball according to the invention is particularly advantageous for teaching shot-making skills to a player. The striking targets clearly indicate the area of the soccer ball which needs to be struck by the player to achieve a particular type of shot. The player can readily easily see the target area. From a coaching point of view, all the coach must do is simply tell the player to strike a particular target area on the soccer ball which the player can readily appreciate and execute the required shot.

In a particularly preferred embodiment, each striking target is denoted by a coloured area on the surface of the soccer ball. Ideally, different striking targets are denoted by different coloured areas on the surface of the soccer ball. This is particularly advantageous for clearly showing the target areas. Children particularly will find this much easier to see the target area. It will be appreciated that most conventional soccer balls are either a single colour, usually white, or two-tone, for example having black and white segments. Thus, coaches find it difficult to verbally explain to players to kick the soccer ball in a particular area to achieve a desired shot. In contrast, advantageously with the soccer ball of the present invention, all a coach has to do is instruct the player to kick the soccer bail in the "blue" area, for example, to achieve the shot. The player can readily easily see the area to be struck and therefore execution of the shot is simplified for the player.

Various striking targets may be provided on the soccer ball for striking the soccer ball, for example, to impart side spin to curve the soccer ball to the right or left, to hit the soccer ball low or for achieving long distance or direct shots.

In another embodiment, each striking target is denoted by an arrow marked on the surface of the soccer ball, a head of the arrow pointing to the striking target.

In a further embodiment, each striking target is denoted by a numbered target area on the surface of the soccer ball.

In another embodiment, heading targets are provided on the soccer ball for striking the soccer ball with the head to direct the soccer ball straight ahead, to one side or the other, downwardly, etc.

In a preferred embodiment, the heading targets comprise a central heading target, located centrally on a face of the soccer ball, a right side heading target and a left side heading target on opposite sides of the face of the soccer ball. Preferably, the central heading target has a centre spot surround by a two-part outer ring comprising an upper segment and a lower segment above and below an equator of the soccer ball.

In some cases, indicia such as a line which may, for example, form an equator line, extending around the soccer ball may be provided, again providing a target for the player to hit either above or below the line to keep the soccer ball either low or high in flight respectively.

In a preferred embodiment, a pair of spaced-apart substantially horizontal and parallel target lines extend around the soccer ball defining therebetween a central equatorial band with an upper target area above the band and a lower target area below the band.

In a particularly preferred embodiment, the striking targets comprise a central target located centrally on a face of the soccer ball, a right side-spin striking target and a left side-spin striking target on opposite sides of the face of the soccer ball.

In a further embodiment, the striking targets additionally comprise an upper target area at a top of the face of the soccer ball and a lower target area at a bottom of the face of the soccer ball.

In another embodiment, arrows are denoted on one or more of the striking targets pointing towards the optimum striking position on the striking target. In particular, the arrows may be provided in the right and left side-spin striking targets.

In a further embodiment, the striking targets are denoted by a set of different coloured bands arranged in a cruciform array on a side of the soccer ball. Preferably, arrows of contrasting colour extend outwardly in each coloured band from an inner central portion towards an outer end of the band. Ideally, each arrow is tapered, the arrow increasing in width towards the outer end of the band.

In another aspect, the invention provides a soccer teaching aid as described above in combination with a soccer boot, said soccer boot having defined striking areas denoted on the surface of the boot. Advantageously, the coach can direct a player to strike a particular target area on the soccer ball with a selected striking area on the surface of the boot. Conveniently, the striking areas on the boot may be denoted by different colours so that the coach could, for example, direct the player to hit the "red" target area on the soccer ball with the "blue" striking area of the boot.

BRIEF DESCRIPTION OF THE DRAWINGS

The invention will be more clearly understood by the following description of some embodiments thereof, given by way of example only, with reference to the accompanying drawings, in which:—

FIG. 1 is an elevational view of a soccer ball according to the invention;

FIG. 2 is an elevational view of another soccer ball according to a second embodiment of the invention;

FIG. 3 is an elevational view of a further soccer ball according to a third embodiment of the invention.

DETAILED DESCRIPTION OF THE PREFERRED EMBODIMENTS

Figure 4:
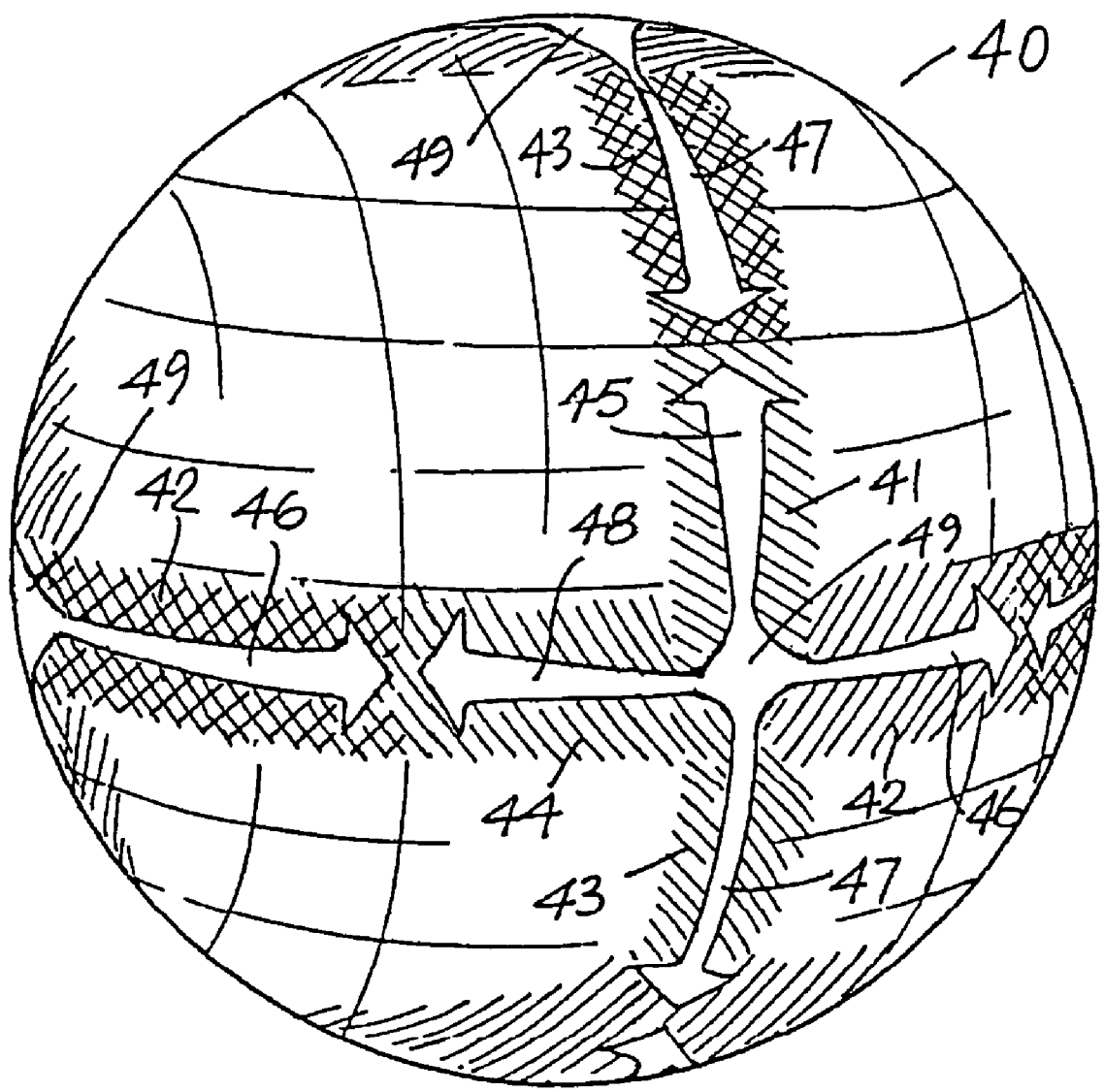
FIG. 4 is an elevational view of another soccer ball according to a fourth embodiment of the invention.

Referring to the drawings, and initially to FIG. 1 thereof, there is illustrated a soccer ball according to the invention, indicated generally by the reference numeral 1. A number of different coloured striking targets are indicated on an outer surface of the soccer ball 1, each striking target indicating an area on the surface of the soccer ball 1 where the soccer ball should be struck to send the soccer ball 1 along an associated flight path when struck in that target area. In this case, the striking targets comprise a central target 2 for kicking the soccer ball along a generally straight flight path. A right side-spin striking target 3 and a left side-spin striking target 4 are denoted by different colored areas on opposite sides of the soccer ball 1. By striking the soccer ball within either of the side-spin striking targets 3, 4, spin is applied to the soccer ball to curve the flight of the soccer ball.

A pair of spaced-apart substantially parallel and generally horizontal target lines 5, 6 extend around the soccer ball 1 and are centrally located between a top and a bottom of the soccer ball 1. The target lines 5, 6 define therebetween a central equatorial band with an upper striking target area above the band and a lower striking target area below the band. Striking the soccer ball 1 below the line 6 will send the soccer ball in a high arcing shot to achieve long distance. The soccer ball 1 can be struck above the line 5 to send the soccer ball 1 on a relatively low flight path, keeping the soccer ball 1 on or close to the playing surface.

In use, a coach can direct a player to strike the soccer ball 1 in one of the clearly defined striking targets 2, 3, 4 to achieve a desired shot. The different colours associated with each striking target 2, 3, 4 clearly show the required area on the soccer ball 1 which is to be struck by the player making it easier for the player to follow the coaches instructions to achieve the desired shot. The lines 5, 6 further assist the coach in clearly directing the player where to strike the soccer ball 1.

Referring now to FIG. 2, there is illustrated another soccer ball indicated generally by the reference numeral 10. The arrangement of striking targets on the surface of the soccer ball 10 is such as to facilitate instruction in correct heading of the soccer ball 10. In this case, the striking targets comprise a centre spot 11 surrounded by a two-part outer ring comprising an upper segment 12 and a lower segment 13. The centre spot 11 provides a target for heading the soccer ball 10 along an initially generally horizontal flight path. The upper segment 12 provides a target for heading the soccer ball 10 downwardly and the lower segment 13 provides a target for directing the soccer ball 10 upwardly for maximum flight distance. A right side striking target 14 and a left side striking target 15 are also provided for heading the soccer ball 10 to the left or right respectively. An equator line 16 is marked around the circumference of the soccer ball 10. Striking the soccer ball 10 above the equator line 16 will tend to urge the soccer ball 10 along a downward flight path, and striking the soccer ball 10 below the equator line 16 will tend to urge the soccer ball upwardly.

Referring now to FIG. 3, there is illustrated another soccer ball 20. In this case, the striking targets comprise a central target area 21, a right side target area 22, a left side target area 23, an upper target area 24 and a lower target area 25. All of the target areas 21, 22, 23, 24, 25 are in different colours to clearly denote each target area. It will be noted that indicating arrows 26 are provided in the right target area 22 and left target area 23 pointing towards an outermost portion of the target area which it is desirable to strike to impart maximum spin to the soccer ball 20.

Referring now to FIG. 4, there is shown another soccer ball 40. In this case, the striking targets are denoted by sets of different coloured bands 41, 42, 43, 44 arranged in a cruciform array on each side of the soccer ball 40. Arrows 45, 46, 47, 48 of contrasting colour, in this case white, extend outwardly in each coloured band 41, 42, 43, 44 from a central portion 49 towards an outer end of the band 41, 42, 43, 44 which it is desirable to strike to impart maximum spin to the soccer ball 40. To emphasise the increased spin imparted as one moves outwardly from the central portion 49, each arrow 45, 46, 47, 48 is tapered—increasing in width towards the outer end of the band 41, 42, 43, 44.

It will be appreciated that the invention provides a soccer ball for the use in coaching soccer ball striking skills. The provision of clearly defined coloured striking targets on the soccer ball greatly assists in the coaching of soccer ball striking skills to players, especially young players.

It is envisaged that any suitable method of clearly denoting the striking targets on the surface of the soccer ball may be provided. The striking targets may be numbered if desired to facilitate coaching. What is important is that the striking targets can be easily identified by the coach and the players. While the colouring of the striking targets is particularly desirable to achieve this end, it is envisaged that in some cases, the striking targets may be provided in a single colour on a contrasting background. Arrows and/or numerals may also be used to denote the striking targets.

Similar targets may be provided on opposite sides of the soccer ball. Alternatively different target formations may be provided on opposite sides of the soccer ball. For example the target configurations shown in FIGS. 1 and 2 may be combined on the same soccer ball or possibly the target configurations of FIGS. 2 and 3 may be provided on the same soccer ball.

The invention is not limited to the embodiments hereinbefore described which may be varied in both construction and detail within the scope of the appended claims.

The invention claimed is:

1. A soccer teaching aid for teaching the correct striking of a soccer ball, the soccer teaching aid comprising:
   a soccer ball having an outer surface,
   a central equatorial band on the outer surface defined by spaced-apart substantially parallel lines extending circumferentially around the soccer ball, the central equatorial band being defined by a first color,
   two striking targets on the outer surface of the soccer ball being located on opposite sides of the central equatorial band,
   each striking target indicating an area on the surface of the soccer ball where the soccer ball should be struck to send the soccer ball along an associated flight path or trajectory when struck in said target area,
   one of the two striking targets being defined by a second color different from said first color, the other of the two striking targets being defined by a third color different from the first color and the second color, and
   a plurality of cruciform arrows having four arrow heads, two of said four arrow heads being located in said central equatorial band and extending within said central equatorial band and the other two of said four arrow heads extending in a direction laterally of said central equatorial band towards said two striking targets.

2. A soccer teaching aid for teaching the correct striking of a soccer ball, the soccer teaching aid comprising:
   a soccer ball having an outer surface,
   a central equatorial band on the outer surface defined by spaced-apart substantially parallel lines extending circumferentially around the soccer ball,
   two striking targets on the outer surface of the soccer ball being located on opposite sides of the central equatorial band,
   each striking target indicating an area on the surface of the soccer ball where the soccer ball should be struck to send the soccer ball along an associated flight path or trajectory when struck in said target area,
   one of the two striking targets being defined by a first color, the other of the two striking targets being defined by a second color different from the first color, and
   a plurality of cruciform arrows having four arrow heads, two of said four arrow heads being located in said central equatorial band and extending within said central equatorial band and the other two of said four arrow heads extending in a direction laterally of said central equatorial band towards said two striking targets.

* * * * *